United States Patent [19]

Munih

[11] Patent Number: 4,506,034
[45] Date of Patent: Mar. 19, 1985

[54] METHOD FOR THE CONTINUOUS PROCESSING OF COARSE-GRAINED WASTE RUBBER INTO A SECONDARY RUBBER RAW MATERIAL

[75] Inventor: Pavel Munih, Kranj, Yugoslavia

[73] Assignee: SAVA KRANJ industrija gumijevih, usnjenih in kemicnih izdelkov n.o.sol.o., Kranj, Yugoslavia

[21] Appl. No.: 444,934

[22] Filed: Nov. 29, 1982

[51] Int. Cl.³ .................. C08J 11/00; C08J 11/02; C08J 11/04
[52] U.S. Cl. ..................... 521/41; 521/45.5; 585/241; 423/449
[58] Field of Search ............ 521/41, 45.5; 260/720; 585/241; 423/449

[56] References Cited

U.S. PATENT DOCUMENTS

| | | | |
|---|---|---|---|
| 2,653,348 | 9/1953 | Elgin et al. | 18/12 |
| 2,653,349 | 9/1953 | Elgin et al. | 18/12 |
| 3,573,241 | 3/1971 | Gotshall | 260/23.7 |
| 3,644,131 | 2/1972 | Gotshall | 106/307 |
| 4,046,834 | 9/1977 | Lee et al. | 260/752 |
| 4,049,588 | 9/1977 | Lee et al. | 260/2.3 |
| 4,090,670 | 5/1978 | Bennett | 521/45.5 |
| 4,171,345 | 10/1979 | Tosher et al. | 585/241 |
| 4,250,158 | 2/1981 | Solbakken et al. | 585/241 |

FOREIGN PATENT DOCUMENTS 1694579 3/1975 Fed. Rep. of Germany.
1592909 10/1977 Fed. Rep. of Germany.
1939715 2/1980 Fed. Rep. of Germany.

OTHER PUBLICATIONS

Chem. Engineering, "Spent-Tire Pyrolysis may add Bounce to Recycling", (Ricci), 8/2/76.
W. O. Murtland, "Current Trends in Scrap Rubber Recycling", Elastomerics, Jan. 1981, pp. 13, et seq.
S. R. Fix, "Microwave Devulcanization of Rubber", Elastomerics, Jun. 1980, pp. 38–40.
Swor, et al., "Ultrafine Recycled Rubber", Paper No. 53, presented at the 117th meeting, Rubber Division, A.C.S., Las Vegas, Nev., May 20–23, 1980.

Primary Examiner—Allan M. Lieberman
Attorney, Agent, or Firm—Pollock, Vande Sande & Priddy

[57] ABSTRACT

A method is provided for the continuous processing of coarse-grained waste rubber into a secondary rubber raw material, in which coarse-grained waste rubber having a particle size of 0.5 to 15 mm, preferably approx. 4 to 6 mm, in a layer of a thickness not exceeding the largest dimension of a single grain is exposed to a thermoshock without the access of oxygen at a temperature of 200° to 900°C., preferably 600° to 800° C., for a time of 5 to 200 seconds, preferably about 30 to 60 seconds, depending on the size of the particles and the desired structure of the product.

11 Claims, 2 Drawing Figures

METHOD FOR THE CONTINUOUS PROCESSING OF COARSE-GRAINED WASTE RUBBER INTO A SECONDARY RUBBER RAW MATERIAL

This invention relates to a new method for the continuous processing of coarse-grained waste rubber into a secondary rubber raw material.

The processing of rubber scrap, especially waste tires, represents one of the major problems at present; both from the standpoint of ecology, as well as the preservation of energy and natural resources. In the processing of rubber products such as tires and other reinforced products, after the elimination of non-rubber ingredients, there remains the rubber component (which shows a defined form and structure depending on the optional preliminary separation method); it is, however, not suitable as a secondary rubber raw material (reclaim). Also, articles made of uncompounded rubber are not suitable for a direct reuse since they are vulcanized and not thermoplastically workable any more.

Therefore, it has been attempted to process waste rubber into a reusable reclaim by means of a suitable treatment.

According to one of the methods the rubber is ground and the obtained crumb is used as filler in the virgin material. Owing to the elasticity of the rubber, the mechanical grinding is economical only in the preparation of granules of the size not smaller than about 0.4 mm. Since such large particles are not anchored homogenously in the matrix of the virgin material, but are likely to "pop out", they are troublesome already during the working of the rubber mixes and may be used only in products of modest quality.

Granules in the micron size range not smaller than approximately 75 μm, which are incorporable into the virgin material in a quantity of up to 30% even in the manufacture of high quality products, are obtainable by means of pulverizing frozen rubber particles ("cryogenic grinding", e.g. W. O. Murtland, Current Trends in Scrap Rubber Recycling, Elastomerics, January 1981, pp. 13-16); even finer particles, e.g. of approximately 20 μm, may be obtained by means of "ultrafine grinding", i.e., a mechanical grinding in the presence of additives which induce devulcanization or other chemical changes (e.g., U.S. Pat. No. 4,049,588).

Another method suggests the processing of waste rubber by means of heat and optional reactants, which results in the devulcanization of the rubber (S. R. Fix, Microwave Devulcanization of Rubber, Elastomerics, June 1980, pp. 38-40; "reclaimator process" in U.S. Pat. Nos. 2,653,348 and 2,653,349). Under extreme conditions, there occurs even a pyrolytical decomposition into gaseous, liquid, and solid components, usually in the ratio of 1:1:1.

According to West German Pat. No. 1,939,715, cured waste rubber is disintegrated into particles of the size of approximately 4 to 8 mm, which are in a layer of a thickness of maximum 50 mm, exposed to pyrolysis under very low pressure till the volatile components are stripped off, whereafter the pyrolysis residue consisting of carbon black and zinc oxide is cooled without access of air. The obtained product may be incorporated as a highly reinforcing extender into caoutchouc mixes. Owing to the working under very low pressure, this method is not very suitable for industrial application.

In spite of the numerous recently suggested solutions for the processing and reuse of rubber scrap as reclaim, they have not gained much importance in practice. This is evident from the fact that the U.S. Department of Energy has set the goal of seeing, in 1987, about 5% recovered rubber incorporated in all rubber products (W. O. Murtland, Current Trends in Scrap Rubber Recycling, Elastomerics, January 1981, p. 13).

The hitherto known methods, namely, are either uneconomical (e.g. cryogenic grinding using $N_2$) or they yield—e.g. mechanical grinding—final products which are not suitable for the incorporation into high-quality articles. In certain cases they are also limited to a specifical raw material, as e.g. in the microwave devulcanization only waste rubber containing a sufficient amount of polar groups or components can be used.

SUMMARY OF THE INVENTION

It has now been found that the drawbacks of the prior art methods can be avoided and waste rubber processed into a superior secondary rubber raw material in a continuous, technologically simple and economical way, if coarse-grained waste rubber is exposed to a rapid heating under specific conditions, i.e. to a "thermoshock".

The present inventive method is performed in such a manner that coarse-grained waste rubber having a particle size of 0.5 to 15 mm, preferably approximately 4 to 6 mm, in a layer of a thickness not exceeding the largest dimension of a single grain is exposed to a thermoshock at a temperature of 200° to 900° C., most suitably of 600° to 800° C., for 5 to 200 seconds, preferably about 30 to 60 seconds—depending on the particle size and the desired structure of the product—and without the access of oxygen.

BEST AND VARIOUS MEANS FOR CARRYING OUT INVENTION

Figure 1:
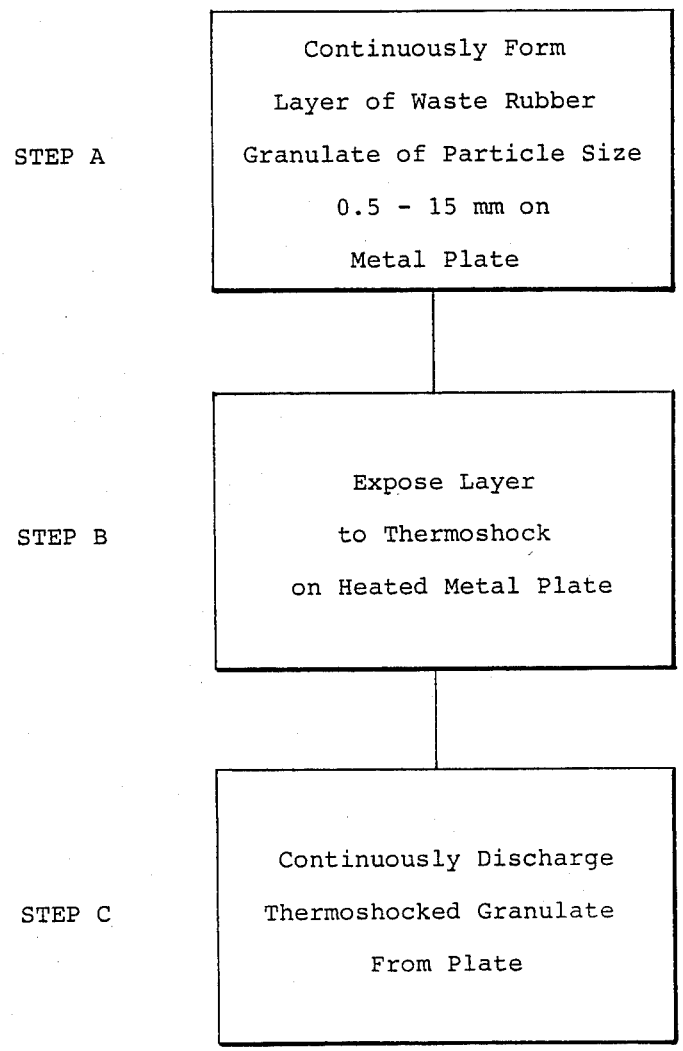
FIG. 1 is a block diagram showing a sequence of steps in accordance with the present invention.
Figure 2:
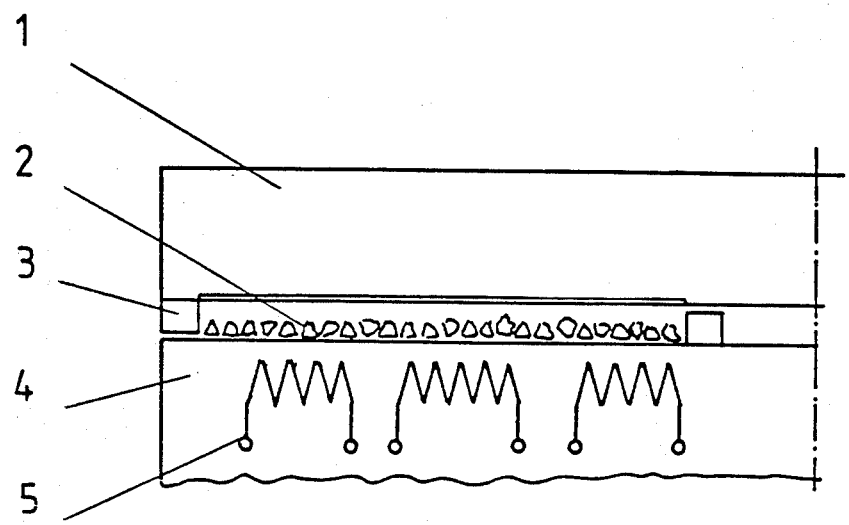
FIG. 2 is a schematic diagram of a channel suitable for carrying out the process of the present invention.

In practice, the present invention is performed in such a manner that the starting granules are continuously charged on a metal plate heated to maximum 900° C., where they are exposed to a thermoshock in the above-defined time of 5 to 200 seconds. During this treatment, the volatile ingredients of the rubber are stripped off, the material is carbonized starting at the surface and advancing to the center of the grain and a thermal decomposition occurs in the core. Owing to the formation of inflammable components, the access of oxygen must be impeded, which is in practice most suitably achieved by performing the thermal shocking in a channel having an inside cross-section slightly larger than the cross-section of charged material, as illustrated in FIG. 2. In FIG. 2, numeral 1 represents a covering for the channel, numeral 2 represents the rubber granulate, and numeral 3 represents a means such as a ring which restricts the size of the particle entering the channel. As illustrated, the channel is somewhat larger in inside cross-section than the cross-section of the granulate. Numeral 4 represents the heat plate, numeral 5 represents the means for heating heat plate 4 such as an elemental heater.

After the heat-treatment, the obtained particles are continuously discharged from the plate and further processed in a known manner, depending on the structural characteristics of the obtained product.

The treatment may be carried on until a complete carbonization of the grains is achieved, which makes possible the mechanical grinding of the obtained carbonized granules into extremely fine grains of a size even smaller than 0.1 μm, which are very suitable as active fillers in rubber stock even for high-quality articles. The obtained quality is comparable with the reinforcing effect imparted to the rubber by the addition of FEF-SRF carbon black (N 550–N 660).

There may also be chosen milder parameters of the heat treatment; in such a case the final product possesses predominantly plastifying characteristics. Also, such a material may be compounded with the virgin material in analogy to the above-mentioned reclaim. The composition of the mmix should be chosen depending on the required properties of the products.

The present inventive method permits the processing of practically all types of rubber scrap, the optimum processing level being adjusted to the elastomer content and the intended use of the product.

The inventor's experiments have shown that rubber reclaim obtained according to the present method exhibits superior properties also at the forming of semimanufactured products since even injection-molded articles possess a high quality surface and dimension stability.

Another advantage of the present inventive method over prior art methods lies therein that it provides approximately two-thirds of the product in solid state instead of only one-third.

The invention is illustrated, but in no way limited by the following Examples which are the best mode for performing the inventive method contemplated by the inventor.

EXAMPLE 1

Processing of waste rubber

Rubber originating from waste passenger tires was disintegrated in a chopper into a crumb of a particle size of 2 to 6 mm and spread by hand onto a metal plate of a surface of about 0.3 $m^2$ heated to about 700° C. and maintained there without the access of oxygen for about 40 seconds. The capacity of the arrangement was about 0.3 kg/min.

EXAMPLE 2

The material obtained in accordance with Example 1 was left to cool down to ambient temperature, whereafter it was sifted through a ASTM 9 screen (aperture of 1.981 mm) in order to separate the finer carbonized fraction from the coarser plastic fraction.

2.1 Testing of the Carbonized Fraction

The carbonized fraction was pulverized in a ball mill and sifted through an ASTM 170 screen (aperture of 88 μm) and compounded into a test formulation with the following components:

| | |
|---|---|
| carbonized fraction (according to the invention) | 50 parts by mass |
| SBR 1500 | 100 parts by mass |
| zinc oxide | 3 parts by mass |
| stearic acid | 2 parts by mass |
| aromatic oil | 10 parts by mass |
| CBS/DPG | 1.7 parts by mass |
| sulfur | 1.7 parts by mass |

SBR = styrene butadiene rubber
CBS = cyclohexylbenzothiazyl-sulfenamide
DPG = diphenyl guanidine Then a reference formulation was prepared, comprising instead of the carbonized product prepared in accordance with the present method, 50 parts by mass conventional carbon black N-762, whereas the remaining ingredients were identical as in the above formation.

In the following Table I there is given a comparison of the formulation comprising the carbonized material prepared in accordance with the invention and of the reference formulation comprising conventional carbon black.

TABLE I

| | Formulation comprising conventional carbon black | Formulation comprising the carbonized material according to the invention |
|---|---|---|
| Specific mass (gravity) (kg/$m^3$) | 1150 | 1120 |
| Hardness (Shore A) | 54 | 50 |
| Modulus 100% (MPa) | 1.4 | 1.4 |
| Tensile strength (MPa) | 12.5 | 10.0 |
| Elongation (%) | 600 | 800 |
| Resilience (%) | 44 | 43 |

2.2 Testing of the Plastic Fraction

In this test a high quality rubber mix of the following composition was extended with up to 30 parts by mass of the plastic reaction obtained as residue on the ASTM 9 screen (aperture of 1.981 mm) at the sifting of the material obtained as described in Example 1.

| Composition of the Rubber Formulation | |
|---|---|
| NR/SBR | 70/30 parts by mass |
| carbon black N 220 | 45.0 parts by mass |
| aromatic oil | 5.0 parts by mass |
| zinc oxide | 3.0 parts by mass |
| stearic acid | 2.0 parts by mass |
| microcrystalline wax | 2.0 parts by mass |
| cyclohexylbenzothiazyl-sufeneamide | 1.5 parts by mass |
| sulfur | 1.5 parts by mass |

TABLE II

| | | | | |
|---|---|---|---|---|
| Blend NR/BR (parts by mass) | 100 | 100 | 100 | 100 |
| Plastic fraction (parts by mass) | 0 | 0 | 0 | 0 |
| Specific mass (gravity) (kg/m3) | 1130 | 1140 | 1140 | 1150 |
| Hardness (Shore A) | 62 | 62 | 62 | 61 |
| Modulus 100% (MPa) | 2.0 | 1.8 | 1.6 | 1.4 |
| Tensile strength (MPa) | 22.0 | 18.0 | 15.0 | 12.0 |
| Elongation (%) | 500 | 500 | 540 | 540 |
| Resilience (%) | 35 | 30 | 27 | 25 |

What is claimed is:

1. A method for processing coarse-grained waste rubber to provide a secondary rubber raw material which comprises:
   providing a single layer of coarse-grained waste rubber particles having particle sizes of 0.5 to 15 mm wherein the thickness of said layer does not exceed the largest dimension of a single waste rubber particle;

exposing said layer to thermoshock at a temperature of 200° to 900° C. for 5 to 200 seconds, whereby the access of oxygen to said waste rubber particles is impeded by the stripping of the volatile ingredients form the waste rubber particles during thermoshock.

2. The method of claim 1 wherein the particle sizes of said waste rubber particles are about 4 to 6 mm.

3. The method of claim 1 wherein said temperature is 600° to 800° C.

4. The method of claim 1 wherein said time is about 30 to 60 seconds.

5. The method of claim 1 wherein said rubber is a diolefin rubber.

6. The method of claim 1 wherein the particle sizes of said waste rubber particles are about 4 to 6 mm and said temperature is 600° to 800° C.

7. The method of claim 6 wherein said rubber is diolefin rubber.

8. The method of claim 6 wherein said time is about 30 to 60 seconds.

9. The method of claim 6 wherein said time is about 30 to 60 seconds.

10. A method for processing coarse-grained waste rubber to provide a secondary rubber raw material which comprises:
    continuously charging waste rubber particles on to a heat plate to provide a single layer of rubber particles having particle sizes of 0.5 to 15 mm., wherein the thickness of said layer does not exceed the largest dimension of a single waste rubber particle; exposing said layer to thermoshock at a temperature of 200° tp 900° C. for 5 to 200 seconds, whereby the access of oxygen to the waste rubber particles is impeded by the stripping of the volatile ingredients from the waste rubber particles during thermoshock; continuously discharging the thermoshocked waste rubber particles from the heat plate.

11. The method of claim 10 wherein the particle sizes of said waste rubber particles are about 4 to 6 mm and said temperature is 600° to 800° C.

* * * * *